United States Patent [19]

Mangus

[11] 4,164,849
[45] Aug. 21, 1979

[54] METHOD AND APPARATUS FOR THERMAL POWER GENERATION

[75] Inventor: James D. Mangus, Hempfield Township, Westmoreland County, Pa.

[73] Assignee: The United States of America as represented by the United States Department of Energy, Washington, D.C.

[21] Appl. No.: 728,478

[22] Filed: Sep. 30, 1976

[51] Int. Cl.² ............................................. F01K 7/22
[52] U.S. Cl. ...................................... 60/679; 60/644; 122/483; 60/653
[58] Field of Search ................. 60/644, 653, 679, 680; 122/483

[56] References Cited

U.S. PATENT DOCUMENTS 2,865,827  12/1958  Dwyer .............................. 60/644 X

FOREIGN PATENT DOCUMENTS 774225  5/1957  United Kingdom ...................... 60/679

Primary Examiner—Allen M. Ostrager
Attorney, Agent, or Firm—Edward L. Levine; Z. L. Dermer

[57] ABSTRACT

A method and apparatus for power generation from a recirculating superheat-reheat circuit with multiple expansion stages which alleviates complex control systems and minimizes thermal cycling of system components, particularly the reheater. The invention includes preheating cold reheat fluid from the first expansion stage prior to its entering the reheater with fluid from the evaporator or drum component.

11 Claims, 5 Drawing Figures

4,164,849

METHOD AND APPARATUS FOR THERMAL POWER GENERATION

BACKGROUND OF THE INVENTION

1. Field of the Invention

This invention relates to an improved system for thermal power generation. More specifically, it relates to that system typically referred to as a reheat cycle, and typically utilized with large nuclear reactors, where the discharge from a first expansion stage is reheated prior to subsequent expansion. This invention places the discharge from the first stage in heat transfer relation with fluid at conditions of a drum component prior to reheating, thereby alleviating the need for complicated flow control apparatus and minimizing thermal cycling of components with changes in load.

2. Description of the Prior Art

A reheat thermal cycle has typically been used in many applications where, due to the type and magnitude of the power source, it is desirable to provide multiple expansion stages. Reheat cycles typically are used in conjunction with superheated fluids and in both once-through and recirculating cycles. A recirculating cycle utilizes recirculation of fluid between an evaporator and a drum. A basic reheat cycle superheats the utilization fluid in a superheater, expands it in a first turbine, reheats in a reheater, sometimes referred to as a resuperheater, and expands it in one or more subsequent turbines. A reheat cycle has been considered the most efficient and advantageous for large nuclear power plant application, particularly so for liquid metal cooled fast breeder reactors. Such reactors generally include a primary circuit circulating a liquid metal coolant such as sodium, an intermediate circuit circulating an intermediate fluid, typically similar to the primary liquid, and a utilization circuit or thermal cycle circulating a vaporizable fluid, such as water. Heat energy is transferred from the primary circuit to the intermediate circuit and then to the utilization circuit, vaporizing and superheating the utilization fluid which drives the series of turbines to produce electric power. The evaporator, drum, and superheater may be separate components or combined units.

Use of a reheat cycle for such application, however, presents concerns as the high heat transfer rate of liquid metals causes severe thermal shock to metal structures, including the superheater and reheater, when system temperature changes occur. These temperature changes occur during plant startup and shutdown, as well as during load changes resulting from increasing or decreasing load demand from the connected electrical system. To mitigate these thermal concerns, several prior art arrangements have been utilized and proposed which, in general, are based upon changing the relative intermediate fluid flow distribution between the superheater and reheater components. These are complicated active control systems which generally include valves and/or pumps operating primarily upon the intermediate fluid circuit, and which must balance flows and sense various parameter changes in all three fluid circuits. The prime control function of such systems is to split and vary the flow of intermediate fluid between the superheater and reheater components. While such control systems reduce the thermal cycling concerns, they do not eliminate it, and further controls such as steam attemporators are typically required. Further, the operational reliability of such control apparatus is a significant concern which can lead to failures and extensive and costly downtime.

SUMMARY OF THE INVENTION

This invention method and apparatus alleviates the thermal cycling and control reliability concerns by providing, in the main embodiment, a passive system which automatically reduces thermal transients in the superheater and reheater upon changes in load. The invention includes, for a thermal superheat-reheat cycle, typically a recirculating superheated steam cycle, placing fluid discharged from the first stage turbine in heat transfer relation with fluid in or at temperature conditions similar to the drum component, prior to entering the reheater and subsequent turbine stages. In the preferred embodiment, this fluid is directed through a tube-type heat exchanger in the drum. Thus, fluid which is directed from the evaporator to the drum is then passed to the superheater at approximately the same temperature as fluid directed from the first turbine stage through the drum and to the reheater. Hot liquid metal in the intermediate circuit is split into two flow streams which pass in parallel through the superheater and reheater, and which are then joined prior to passage through the evaporator. Under these conditions, i.e. approximately equal steam temperature to the superheater and reheater, and equal sodium temperature to the superheater and reheater, the ratio of fluid flowing in the streams is approximately equal for any load. Also, the metal structure temperatures are approximately constant over the load range, thereby significantly minimizing thermal cycling of the structures. These benefits result from a basically passive system, requiring no added pump or valve control elements.

BRIEF DESCRIPTION OF THE DRAWINGS

The functions and advantages of the invention will become more apparent from the following description taken in consideration with the accompanying drawings in which.

DESCRIPTION OF THE PREFERRED EMBODIMENTS

Figure 1:
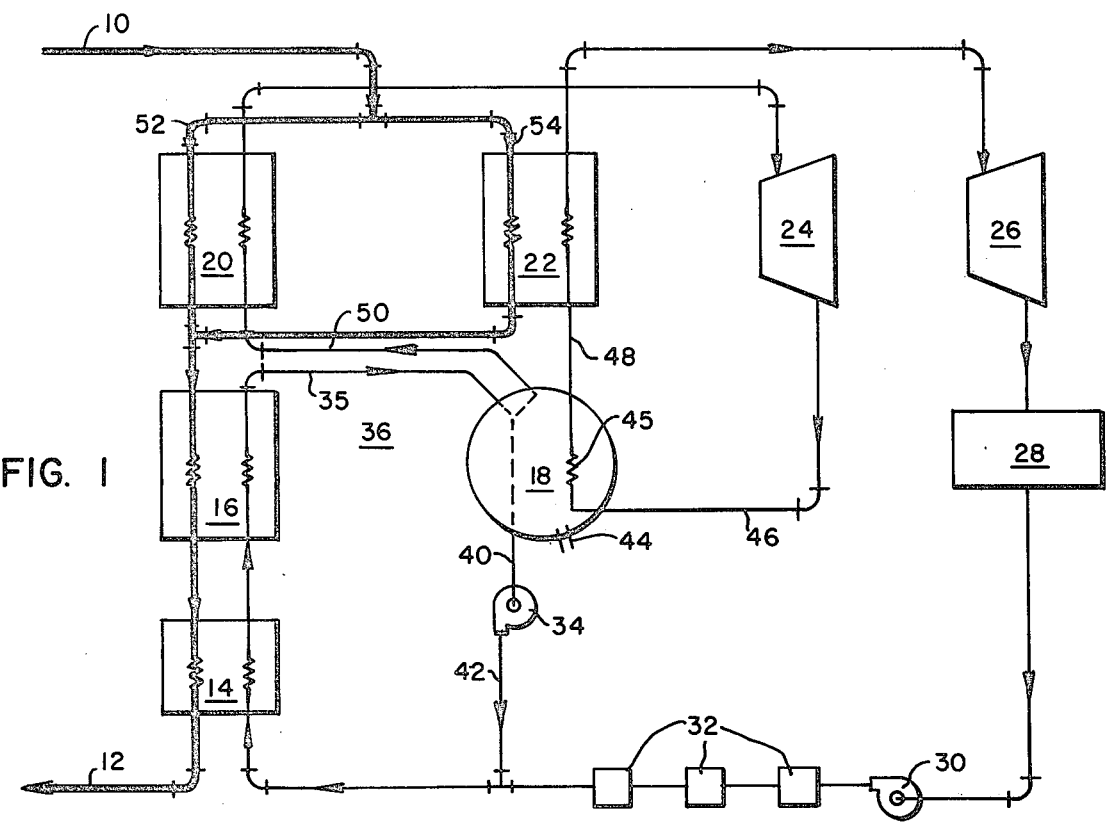
FIG. 1 is a flow schematic of a utilization circuit utilizing one embodiment of the instant invention.

Referring now to FIG. 1, there is shown a utilization circuit incorporating the instant invention. The conduits 10 and 12 are respectively the main inlet and outlet of fluid from the heat source. For purposes of illustration, the heat source is presumed to be a sodium cooled fast breeder reactor, comprising a primary circuit circulating liquid sodium and an intermediate circuit also circulating liquid sodium in heat exchange relationship with the primary and utilization circuits. It is to be understood, however, that the heat source may be any system, fossil or nuclear, including one or more circuits circulating a fluid in heat exchange relationship with the utilization fluid in the utilization circuit. Similarly, the illustrative utilization fluid is water transformed to steam, although other vaporizable fluids may be utilized. The invention is particularly beneficial when utilized with a liquid metal heat source circuit due to the high heat transfer coefficient of liquid metals which, in the prior art, results in a greater magnitude of thermal cycling than in circuits utilizing other fluids.

The components shown in FIG. 1 include a preheater 14, an evaporator 16, a steam drum 18, a superheater 20, a reheater 22, a first expansion apparatus 24 and a second expansion apparatus 26, typically steam turbines, a condenser 28, a feedwater pump 30, feedwater heaters 32, a recirculation pump 34, and conduits connecting these components in the manner shown. The preheater 14, evaporator 16, drum 18, and superheater 20, although performing distinct functions, may be combined units. The term "steam generation system" 36, when used herein refers to those components through which the source fluid is passed, such as the evaporator 16, superheater 20, and reheater 22.

In a typical recirculating superheat-reheat utilization circuit, and in accordance with the instant invention, the preheater 14 may or may not be incorporated. Typically in the prior art, flow from the heat source is serially through the superheater 20 and reheater 22 (sometimes referred to as a resuperheater) in parallel, through the evaporator 16, through the preheater 14 if utilized, and returned through conduit 12 to heat exchange relationship with the heat source. The main stream of vaporizable fluid, or water/steam flow, is typically passed serially through the preheater 14, evaporator 16, drum 18, superheater 20, first turbine 24, reheater 22, second turbine 26, condenser 28, and pumped through the feedwater heaters 32 to the preheater 14 or alternatively to the drum 18, completing the circuit. A portion of the water condensed in the drum is recirculated through conduits 40 and 42 by the pump 34. The operation is such that the temperature in the drum 18 and the temperature of steam in conduit 35 (when arranged as in FIG. 1) is maintained approximately constant. Flow through conduit 35 is also maintained approximately constant throughout the operating load range, primarily by varying the recirculation flow. A portion of the water condensed in the drum is also typically "blown down" through a nozzle 44, either continuously or intermittently, to maintain chemistry control.

The primary difference between the prior art and the preferred embodiment as shown in FIG. 1 is the passage of the discharge from the turbine 24 through conduit 46 and through heat exchange means 45 in the drum 18, in heat exchange relation with the other fluids in the drum 18, desirably the condensed liquid. The heat exchange means 45 may be tubes, at least a portion of which are submerged in the condensed liquid within the drum 18. This places the fluid passed to the reheater 22 through conduit 48 at approxmately the same temperature as the fluid passed to the superheater 20 through conduit 50.

Under such conditions, there need be no active controls to vary the relative flows between conduits 52 and 54 passing the heat source fluid, with changes in system power level. This passive system represents a significant advantage over the prior art, which does require complex control elements to vary the flows as necessary with power changes; this typically includes changing the relative flow distribution between the superheater 20 and reheater 22 units, by such controls as multiple valves, sensing devices, and other flow and temperature control means such as pumps and steam attemperators, which not only regulate parameters throughout the utilization circuit, but also through the heat source circuit or circuits. Further, as such control systems inherently have a time delay when varying parameters, significant thermal cycling of the system is involved, particularly in the reheater 22. The instant invention, however, passively alleviates thermal cycling and the necessity for complex active controls.

Dependent upon the type, size and number of components in the utilization circuit, the ratio of flows through conduits 52 and 54 and through conduits 48 and 50 will be fixed. This may be done by properly sizing the inside diameter of the conduits consistent with system requirements, and if necessary, fine tuning the flow during construction and testing by placing orifices or other passive flow control devices in the conduits. The flow is therefore desirably adjusted such that, throughout the operating load range, the ratio of sodium flow through conduit 52 to sodium flow through conduit 54 is approximately constant. The same is true for steam flow through conduit 50 and conduit 48.

To illustrate the advantageous functioning of a system under such conditions consider, for example, a load change from one hundred percent power to fifty percent power. Whatever adjustments are necessary to reduce flows and other parameters throughout the utilization and heat source circuits, the ratios of flows through the superheater 20 and reheater 22 are automatically maintained. Similarly, as the fluid from the heat source enters the utilization circuit from a common path, as shown by the conduit 10, and the utilization fluid to the superheater 20 and reheater 22 is from a common temperature source, the drum 18, the temperatures are automatically matched. Also, operation of a recirculating system utilizing a drum is such that the drum 18 temperature remains relatively constant throughout the operating load range. As the basic control mechanism during a load change is to vary the flow rate of fluid through the heat source and hence through the heat source side of the utilization circuit components, thermal cycling of the reheater 22 is alleviated. In the prior art, when the turbines 24, 26 go to part load, the pressure and temperature of the cold reheat steam (in conduit 46) drops, which changes the relative loads between the superheater 20 and the reheater 22, and therefore, the temperature profile, resulting in undesirable thermal cycling. This is alleviated in the instant invention by automatically heating the cold reheat steam to an approximately constant temperature before entering the reheater 22.

Figure 2:
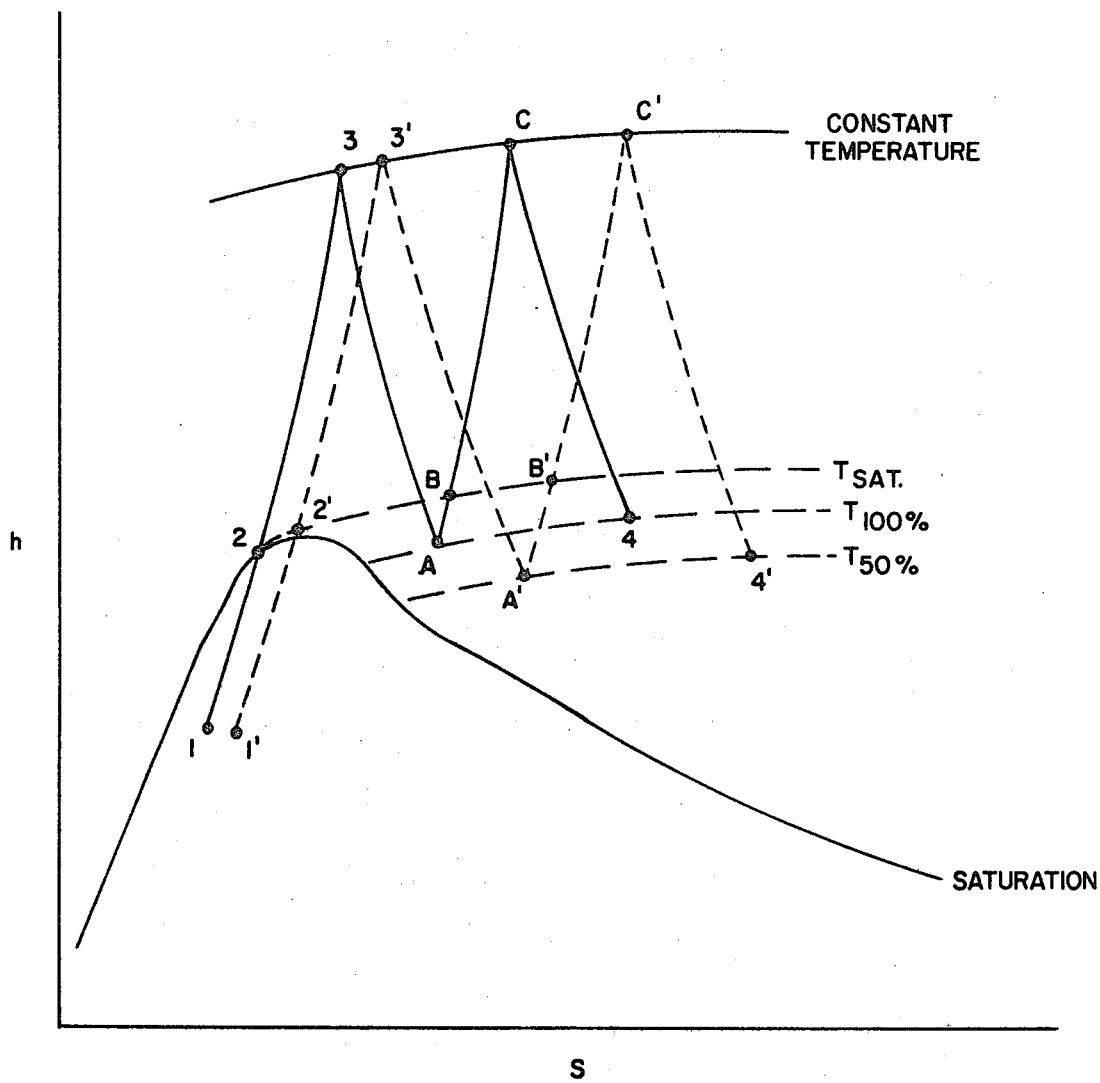
FIG. 2 is enthalpy-entropy diagram of a partial utilization circuit.

This concept can be further exemplified by FIG. 2, which shows a portion of a superheat-reheat steam cycle represented on an enthalpy(h)-entropy(s), or Mollier diagram. The solid line represents the cycle at full load; the dotted line represents the cycle at half load. Point 1 illustrates the inlet of the evaporator 16. The feedwater is brought to saturation through the evaporator 16 and drum 18, and is then superheated in the superheater 20, represented by point 2 to point 3. It then expands in the turbine 24, point 3 to point A, and is reheated between points A and C, prior to subsequent expansion. In prior art systems, all of the reheating (points A to C) is performed by the reheater. In accordance with the instant invention, passage through the drum 18 performs the reheating from point A to point B, and the reheater 22 performs the further reheating, points B to C.

Three major advantages can be seen from the diagram. The first is the alleviation of thermal cycling of the reheater with load changes. With a load decrease, a prior art reheater receives cold reheat steam at a reduced temperature, the difference between A and A'. Similarly, on load increases, the inlet temperature rises from A' to A. With the instant invention, however, a reheater receives steam which already has been heated in the drum, whatever the load, and therefore receives steam at approximately the same temperature, B or B'. At any operating load, the reheater raises the temperature of the steam to an approximately constant value, C or C'. To state the conditions in another manner, the reheater in the prior art must raise the steam temperature from A to C at full load, and from A' to C', a greater magnitude, at part load. The reheater of the instant invention must raise the temperature from B to C at full load, and from B' to C' at part load, an approximately same temperature differential. This leads to the second advantage, a smaller reheater. The reheater need only provide sufficient surface area to reheat the steam between points B and C or B' and C', while a prior art unit must be larger to reheat the steam between a point below point A', and C'. From a cost standpoint, the reduction in reheater size may offset the cost of the added heat exchange means within the drum. The third advantage results from the first two. Alleviating the thermal cycling concern and reducing the preheater surface area significantly reduces any likelihood of reheater failure. With a liquid metal circulating heat source, ensuring integrity of the preheater is of prime concern, as the exothermic reaction upon mixing of a liquid metal, such as sodium, and water, could significantly damage the system. Although there will be some thermal cycling of the heat exchange means within the drum, the heat transfer is between water and steam, and not, for example, sodium and steam.

Figure 3:
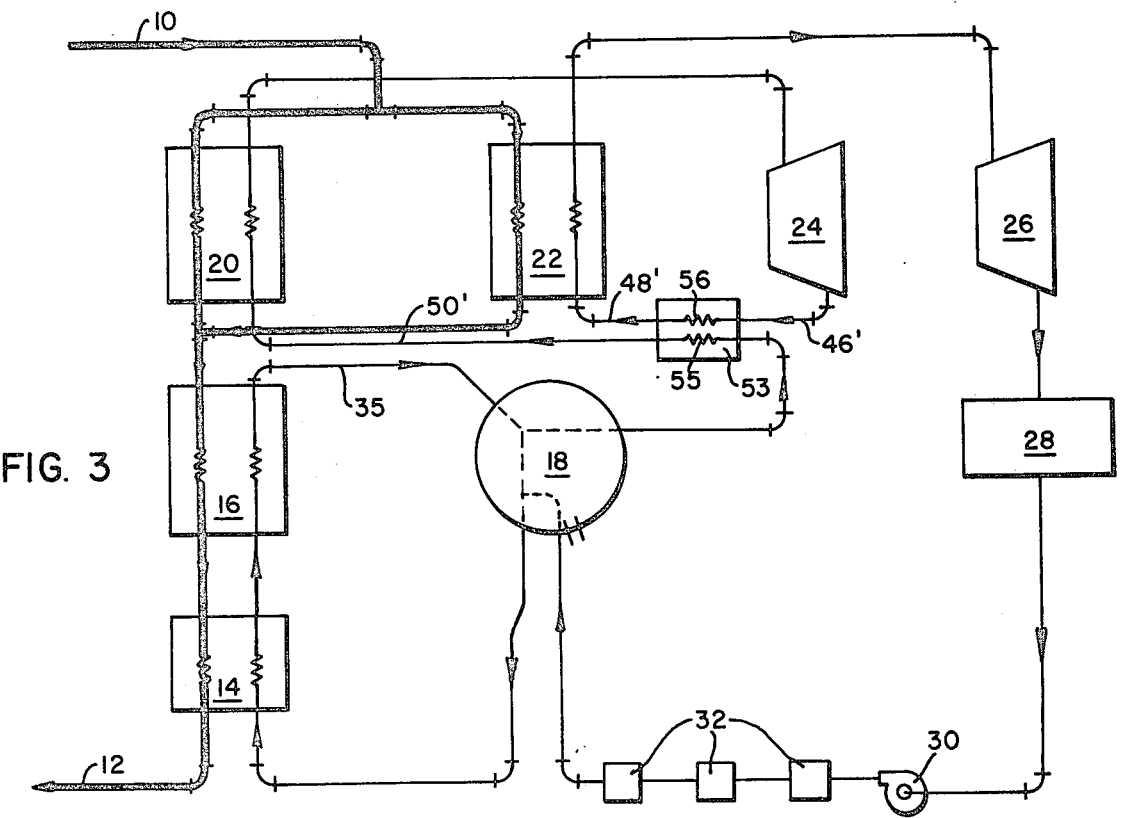
FIG. 3 is a flow schematic of a utilization circuit utilizing another embodiment of the instant invention.

FIG. 3 represents another embodiment of the instant invention, which also passively functions to alleviate reheater 22 thermal cycling upon load changes. As shown, flow of fluid from the heat source is unchanged. However, the flow path of the utilization fluid is modified such that the cold reheat steam from the first expansion 24 is passed through a separate heat exchange means 53, shown as a tube and shell heat exchanger, prior to passage through the reheater 22. The main stream of utilization fluid therefore passes serially through the preheater 14, the evaporator 16, conduit 35 to the drum 18, then through a first flow path 55 in the heat exchanger 53, through conduit 50' to superheater 20, through the first expansion 24, through a second flow path 56 of the heat exchanger 53, through conduit 48' to the reheater 22, through the second expansion 26 and condenser 28, and pumped through the feedwater heaters 32, drum 18, and returned to the preheater 14. The particular flow path, as shown, passing from the feedwater heaters 32 through the drum 18 has been utilized in the prior art, and is not dependent upon the means utilized to heat the utilization fluid between the first expansion 24 and the reheater 22.

The performance and function of this embodiment is similar to that discussed above, and represents an alternate method for alleviating complex controls and thermal cycling of the reheater 22. Although the heat exchange means 53 will be subject to some thermal cycling, it is a smaller and less costly component than the reheater 22. Further, it passes only the utilization fluid through both flow paths, not a liquid metal which typically has a higher specific heat than a utilization fluid, such as water. It should be noted that as the drum 18 raises the quality of the fluid exiting the evaporator 16, and not the temperature, another suitable flow path (not shown) would be serially from the evaporator 16, through the heat exchange means 53 and then the drum 18, and then to the superheater 20.

Figure 4:
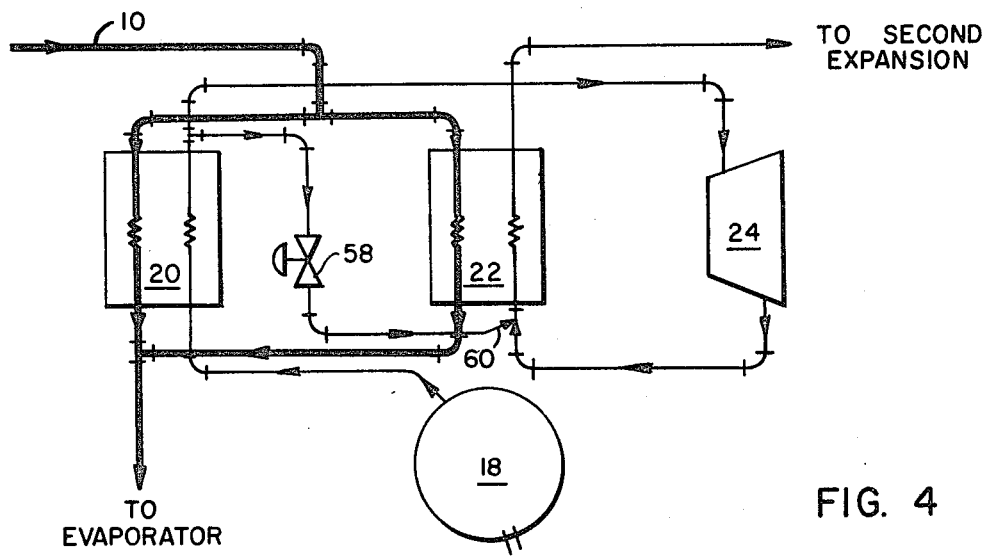
FIG. 4 is a flow schematic of part of a utilization circuit incorporating another embodiment of the instant invention.

It should further be noted that the invention is compatible with typical modifications of the utilization circuit. These include such items as additional expansion stages, bleeding utilization fluid from the expansions to preheat the feed to the evaporator 16, and utilizing blowdown fluid to preheat the feed, among many others. Other alternatives are also applicable to the above teachings. One, for example, which does provide the thermal cycling advantage but which, however, requires some active control, is shown in FIG. 4. This embodiment utilizes direct mixing of some fluid from the superheater 20 with the cold reheat fluid from the first turbine 24, eliminating the need for the previouly illustrated heat exchange means 45 and 53. Although this requires an active steam control system, typically including a valve 58, active control of the heat source fluid is still eliminated. An advantageous means of mixing would be through a jet pump or steam ejector 60, by which the pressure of the fluid entering the reheater 22 could be increased as well as the temperature. This provides the added benefit of recovering part of the line pressure losses.

Figure 5:
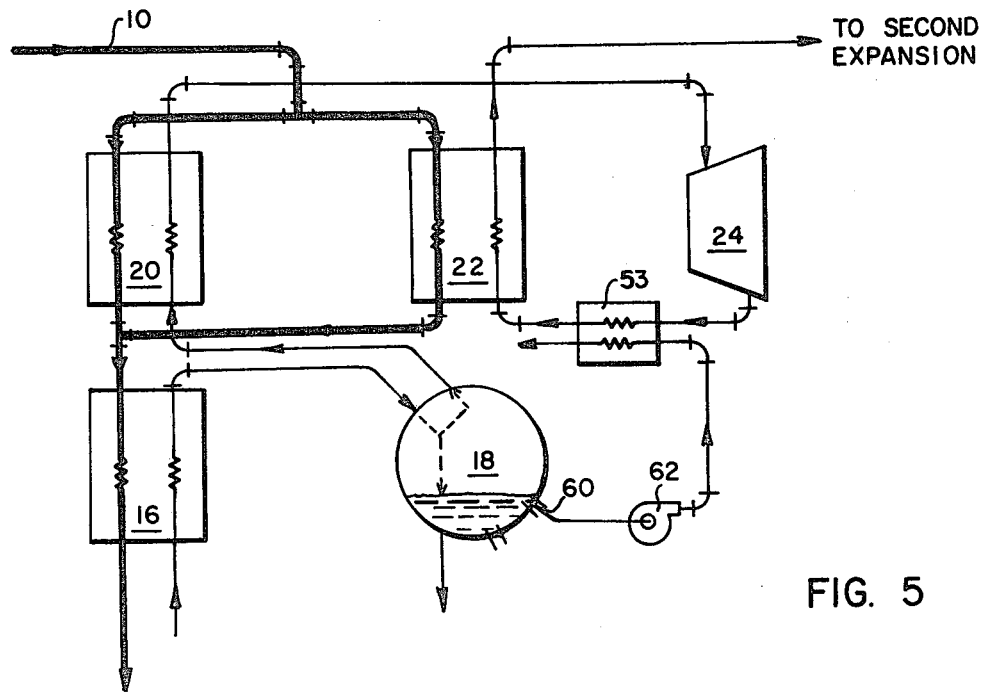
FIG. 5 is also a flow schematic of part of a utilization circuit incorporating yet another embodiment of the instant invention.

Another modification consistent with the instant teaching, similar to the embodiment shown in FIG. 3, is shown in FIG. 5. Here the source of heat for the cold reheat steam in the heat exchange means 53 is the hot liquid from the drum 18. A portion of the liquid is passed from the drum 18 through an outlet nozzle 60 to the heat exchanger 53, heating the reheat fluid prior to its entering the reheater 22. The liquid from the drum 18 may be pumped by pump 62 to the exchange means 53. The fluid exiting the unit 53 may then be returned to the drum for recirculation to the evaporator 16, or directed to the feedwater heaters.

It will be apparent that many other modifications and variations are possible in view of the above teachings. It therefore is to be understood that within the scope of the appended claims, the invention may be practiced other than as specifically described.

I claim:

1. Apparatus for thermal power generation comprising:
   a. a circulating vaporizable utilization fluid,
   b. an evaporator wherein said fluid is vaporized,
   c. a drum wherein liquid is separated from said vaporized fluid so as to form a liquified portion and a saturated vapor portion,
   d. a superheater wherein said vapor portion is superheated,
   e. a first expansion means wherein said superheated fluid is expanded,
   f. heat exchange means wherein said expanded fluid is in heat exchange relation with fluid from one of said evaporator, said drum, and said superheater, and is preheated, subsequent to said expansion,
   g. a reheater wherein said preheated fluid is resuperheated,
   h. at least one second expansion means wherein said resuperheated fluid is expanded,
   i. a condenser wherein said last-named fluid is condensed, and j. means to combine liquid from said liquified portion and said condensed fluid prior to entry into said evaporator.

2. The apparatus of claim 1 wherein said heat exchange means comprises tubing through said drum whereby said expanded fluid is passed through the interior of said tubes in heat exchange relation with fluid contained within said drum.

3. The apparatus of claim 1 wherein said heat exchange means comprises a tube and shell heat exchanger whereby said expanded fluid is passed through the interior of said tubes and said first portion is passed along the exterior of said tubes prior to entry into said superheater.

4. The apparatus of claim 1 wherein said heat exchange means comprises a steam ejector whereby a portion of the superheated fluid discharged from said superheater is mixed with said expanded fluid prior to entry into said reheater.

5. An improved apparatus for thermal power generation of the type wherein a vaporizable fluid is circulated through a superheat-reheat thermal cycle such that said fluid serially flows through an evaporator, drum, superheater, a first turbine, a reheater, and a second turbine, liquid in said vaporizable fluid upon discharge of said fluid from said evaporator being separated in said drum so as to form a liquified portion and a saturated vapor portion, wherein the improvement comprises:

heat exchange means placing in heat transfer relation fluid discharged from said first turbine and said liquified and vapor portions within said drum, prior to said fluid discharged from said first turbine entering said reheater, means to direct fluid from said first turbine to said heat exchange means, and means to direct fluid from said heat exchange means to said reheater.

6. A thermal power plant comprising a first circuit circulating a coolant between a heat source and a steam generation system and a utilization circuit circulating a vaporizable fluid between said steam generation system and expansion means, said steam generation system comprising an evaporator, superheater, and reheater, said utilization circuit comprising a drum and heat exchange means, said vaporizable fluid having liquid separated therefrom in said drum, said expansion means comprising a first turbine and a second turbine, said heat exchange means placing in heat transfer relation fluid from said first turbine and fluid from one of said evaporator and drum, and conduits flow connecting said steam generation system and said utilization circuit in a manner such that said coolant passes in parallel through said superheater and said reheater and then collectively through said evaporator, and the main stream of said vaporizable fluid passes serially through said evaporator, said drum, said superheater, said first turbine, said heat exchange means, said reheater, and said second turbine.

7. The plant of claim 6 wherein said heat exchange means places in heat transfer relation fluid discharged from said evaporator, such that said main steam passes serially through said evaporator, said heat exchange means, said drum, said superheater, said first turbine, said heat exchange means, said reheater, and said second turbine.

8. The plant of claim 6 wherein said first circuit comprises a primary circuit circulating a first coolant in heat exchange relation with an intermediate circuit circulating an intermediate coolant, said intermediate coolant being in heat exchange relation with said steam generation system.

9. The plant of claim 8 wherein said first coolant comprises a liquid metal, said intermediate coolant comprises a liquid metal, and said vaporizable fluid comprises water.

10. Apparatus for thermal power generation comprising:
 a. a circulating vaporizable utilization fluid,
 b. an evaporator wherein said fluid is vaporized,
 c. a drum wherein liquid is separated from said vaporized fluid so as to form a liquified portion and a saturated vapor,
 d. a superheater wherein said saturated vapor is superheated,
 e. a first expansion means wherein said superheated fluid is expanded,
 f. heat exchange means wherein said expanded fluid is in heat exchange relation with fluid from one of said evaporator, said drum, and said superheater, and is preheated, subsequent to said expansion,
 g. a reheater wherein said preheated fluid is resuperheated, and
 h. at least one second expansion means wherein said resuperheated fluid is expanded.

11. A method of thermal power generation utilizing a vaporizable fluid comprising the steps of:
 a. passing said fluid through an evaporator wherein said fluid is vaporized,
 b. passing said vaporized fluid through a drum such that liquid is separated from said vaporized fluid so as to form a liquified portion and a saturated vapor subsequent to vaporization in said evaporator,
 c. pasing said saturated vapor through a superheater wherein said saturated vapor is superheated,
 d. passing said superheated fluid through a first expansion means wherein said superheated fluid is expanded,
 e. passing said expanded fluid through a heat exchange means such that said expanded fluid is in heat exchange relation with fluid from one of said evaporator, said drum, and said superheater, and is preheated,
 f. passing said preheated fluid through a reheater such that said preheated fluid is resuperheated, and
 g. passing said resuperheated fluid through at least one second expansion means such that said resuperheated fluid is expanded.

* * * * *